(12) United States Patent
Park et al.

(10) Patent No.: US 7,524,361 B2
(45) Date of Patent: Apr. 28, 2009

(54) POROUS HYDROGEN SEPARATION MEMBRANE AND METHOD FOR PREPARING THE SAME

(75) Inventors: Jong-Soo Park, Daejeon (KR); Wang-Lai Yoon, Daejeon (KR); Ho-Tae Lee, Daejeon (KR); Dong-Won Kim, Gyeonggi-Do (KR); Sung-Ho Cho, Daejeon (KR); Shin-Kun Ryi, Daejeon (KR); Seung-Hoon Choi, Daejeon (KR)

(73) Assignee: Korea Institute of Energy Research (KR)

( * ) Notice: Subject to any disclaimer, the term of this patent is extended or adjusted under 35 U.S.C. 154(b) by 507 days.

(21) Appl. No.: 11/330,707

(22) Filed: Jan. 12, 2006

(65) Prior Publication Data

US 2007/0157811 A1 Jul. 12, 2007

(51) Int. Cl.
*B01D 53/22* (2006.01)

(52) U.S. Cl. .............. 96/4; 96/108; 95/55; 95/56; 95/116; 95/127; 55/523; 55/524; 419/2; 419/23; 419/35; 419/58; 419/64; 419/68

(58) Field of Classification Search .............. 95/55, 95/56, 90, 116, 127; 96/4, 108; 55/523, 55/524; 419/2, 23, 31, 35, 39, 58, 61, 63, 419/64, 68
See application file for complete search history.

(56) References Cited

U.S. PATENT DOCUMENTS

| | | | | |
|---|---|---|---|---|
| 4,482,360 A | * | 11/1984 | Taketomo et al. | 95/56 |
| 4,873,835 A | * | 10/1989 | Rojey et al. | 95/50 |
| 5,114,447 A | * | 5/1992 | Davis | 55/523 |
| 5,364,586 A | * | 11/1994 | Trusov et al. | 210/500.25 |
| 5,487,771 A | * | 1/1996 | Zeller | 55/523 |
| 5,993,502 A | * | 11/1999 | Motoki et al. | 55/523 |
| 7,112,237 B2 | * | 9/2006 | Zeller et al. | 55/523 |
| 7,297,271 B2 | * | 11/2007 | Onishi et al. | 55/523 |
| 7,390,348 B2 | * | 6/2008 | Sasaki et al. | 95/56 |
| 2006/0230927 A1 | * | 10/2006 | Xie et al. | 95/55 |

FOREIGN PATENT DOCUMENTS

| | | | |
|---|---|---|---|
| JP | 3-267327 | * | 11/1991 |
| JP | 5-287328 | * | 11/1993 |
| JP | 6-340401 | * | 12/1994 |
| JP | 2004-911 | * | 1/2004 |

OTHER PUBLICATIONS

Ryi et al., "Fabrication and Characterization of Metal Porous Membrane Made of Ni Powder for Hydrogen Separation", Separation and Purification Technology 47:148-155, 2006.

* cited by examiner

*Primary Examiner*—Jason M Greene
(74) *Attorney, Agent, or Firm*—Fish & Richardson P.C.

(57) ABSTRACT

Provided is a hydrogen separation membrane prepared by compression-molding metal microparticles having hydrogen adsorbing properties, wherein the microparticles are composed of 0.5 to 50% by weight of a first metal powder and 50 to 99.5% by weight of a second metal powder having a relatively larger average particle diameter than the first metal powder.

16 Claims, 3 Drawing Sheets

Plane

Cross-section

Plane

Cross-section

Plane

Cross-section

Plane | Cross-section

Plane | Cross-section

Plane        Cross-section

POROUS HYDROGEN SEPARATION MEMBRANE AND METHOD FOR PREPARING THE SAME

BACKGROUND OF THE INVENTION

1. Field of the Invention

The present invention relates to a porous hydrogen separation membrane. More specifically, the present invention relates to a hydrogen separation membrane, capable of simultaneously solving a problem of low hydrogen permeability exhibited by a conventional palladium-based dense separation membrane and a problem of hydrogen embrittlement (HE) exhibited by a stainless steel support, and a method for preparing the same.

2. Description of the Related Art

A great deal of research and study has been made into a process for producing hydrogen via reforming of hydrocarbon, and such attempts are still being actively undertaken. According to a process for producing syngas from hydrocarbon, hydrogen, which is used as a source gas of Polymer Electrolyte Membrane Fuel Cell (PEMFC), is produced via steam reforming and water gas shift reaction (i.e., reaction of carbon monoxide with water), as shown in the following reactions 1 and 2 (A. Basile, L. Paturzo, An experimental study of multilayered composite palladium membrane reactors for partial oxidation of methane to syngas, Catalysis Today 67 (2001) 55):

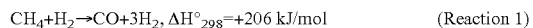  (Reaction 1)

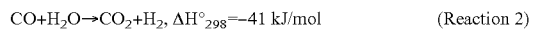  (Reaction 2)

Hydrogen generated in a reactor can force the backward water-forming reaction depending upon concentrations of carbon monoxide and hydrogen and thus the reverse reaction may proceed toward regeneration of methane. As a conversion rate of methane is dependent upon temperatures and removal of hydrogen from the reaction chamber further enhances the conversion rate of methane, thus it is possible to lower an operating temperature of the reactor.

At present, a great deal of research into development of palladium-based dense separation membranes, and porous separation membranes utilizing zeolite or gamma-alumina has been actively undertaken (R. Cheechetto, N. Bazzanella, B. Parron, A. Miotello, Palladium membranes prepared by RF magnetron sputtering for hydrogen purification, Surface and Coatings Technology 177-178 (2004) 73); and T. Tomita, K. Nakayama, H. Sakai, Gas separation characteristics of DDR type zeolite membrane, Microporous and Mesoporous Materials, 68 (2004) 71).

The palladium-based dense separation membrane provides a high degree of separation as it performs a separation process via conduction of hydrogen ions, while suffering from disadvantages such as low hydrogen permeability per unit area, very complicated manufacturing processes, and in particular, hydrogen embrittlement (HE) when using stainless steel-based metal supports. Therefore, intensive efforts have been made to secure durability of the membrane (D. Lee, Y. Lee, S. Nam, B. Sea, K. Lee, Preparation and characterization of $SiO_2$ composite membrane for purification of hydrogen from methanol steam reforming as an energy carrier system for PEMFC, Separation and Purification Technology 32 (2003) 45). In contrast, as the porous separation membrane can provide high hydrogen permeability, it is expected that such a porous separation membrane is applicable to systems in which process configuration can be implemented even at low selectivity, as in processes for producing hydrogen as a source gas for fuel cells.

However, most porous separation membranes, which have been investigated or developed hitherto, employ ceramic-based (gamma alumina, zeolite) supports (D. Lee, L. Zang, S. T Oyama, S. Niu, R. F. Saraf, Synthesis, Characterization, and gas permeation properties of a hydrogen permeable silica membrane supported on porous alumina, J. Membrane Science 231 (2004) 117). In this connection, the most important disadvantage of the separation membranes using ceramic-based supports consists in difficulty of systemization of the completed separation membrane. That is, for multi-layer configuration of the separation membrane, there is a need for construction of the system via sealing and welding, but there still remains substantially no development of technologies for such a purpose until now.

SUMMARY OF THE INVENTION

Therefore, the present invention has been made in view of the above problems, and it is an object of the present invention to provide a hydrogen separation membrane, capable of simultaneously solving a problem of low hydrogen permeability exhibited by a conventional palladium-based dense separation membrane and a problem of hydrogen embrittlement (HE) exhibited by a stainless steel support.

It is another object of the present invention to provide a hydrogen separation membrane of the above first object, having further improved thermal stability.

It is a further object of the present invention to provide a method for preparing a hydrogen separation membrane suitable for industrial-scale production due to a simplified and inexpensive manufacturing process.

In accordance with an aspect of the present invention, the above and other objects can be accomplished by the provision of a hydrogen separation membrane prepared by compression-molding metal microparticles having hydrogen adsorbing properties, wherein the microparticles are composed of 0.5 to 50% by weight of a first metal powder and 50 to 99.5% by weight of a second metal powder having a relatively larger average particle diameter than the first metal powder.

Preferably, the first metal powder is selected from microparticles having an average particle diameter of 0.01 to 0.5 µm.

Preferably, the second metal powder is selected from microparticles having an average particle diameter of 0.8 to 10 µm.

Preferably, the first metal powder is surface-coated with at least one metal selected from the group consisting of Al, Si, Pt, Pd, Ru, Rh, Au and Ag.

Preferably, the second metal powder is reduced by pretreatment under hydrogen atmosphere at 200 to 500° C.

Preferably, the first metal powder and/or second metal powder are nickel powder.

In accordance with another aspect of the present invention, there is provided a method for preparing a hydrogen separation membrane containing metal microparticles having hydrogen adsorption properties, comprising mixing 0.5 to 50% by weight of a first metal powder and 50 to 99.5% by weight of a second metal powder having a relatively larger average particle diameter than the first metal powder; compression-molding the mixed powder under predetermined pressure; and calcining the resulting molded material under hydrogen atmosphere.

Preferably, compression-molding is carried out under pressure of 1 to 20 tons/cm².

Preferably, the first metal powder is surface-coated with at least one metal selected from the group consisting of Al, Si, Pt, Pd, Ru, Rh, Au and Ag.

Preferably, the second metal powder is reduced by pretreatment under hydrogen atmosphere at 200 to 500° C.

Preferably, the first metal powder and/or second metal powder are nickel powder.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the present invention will be described in more detail.

In the present invention, metal microparticles having hydrogen adsorbing properties are selected from the group consisting of metal powders having different average particle diameters.

Figure 1:
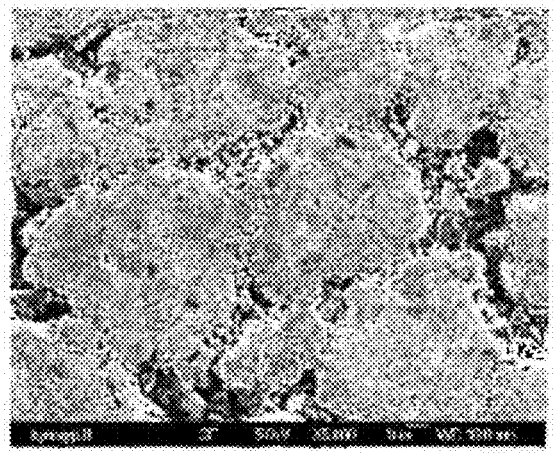
FIG. 1 is an SEM of a porous separation membrane prepared by pressing multi-particle diameter powder consisting of a mixture of 20% by weight of nickel powder having an average particle diameter of 0.15 µm and 80% by weight of nickel powder having an average particle diameter of 5 µm.
Figure 1:
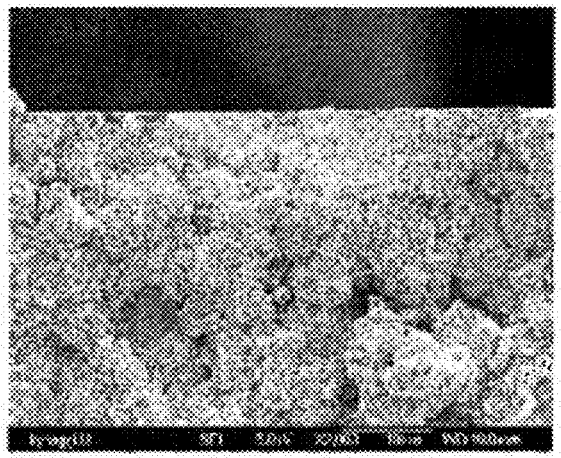

As a smaller particle diameter of powder used in preparation of porous media by pressing fine powder can enhance probability of presence of micropores, it is generally expected that high hydrogen separation efficiency of the media will be maintained. This will be confirmed via comparison between Comparative Examples 1 and 2 which will be described hereinafter. That is, such facts can be also confirmed from the results that the hydrogen separation membrane of Comparative Example 2, prepared using the fine powder having an average particle diameter of 0.15 µm, exhibits high hydrogen/nitrogen selectivity of 24, while the hydrogen separation membrane of Comparative Example 1, prepared using the powder having an average particle diameter of 5 µm, exhibits hydrogen/nitrogen selectivity of 15. In light of such facts, use of finer powder will be required to obtain further improved results, but this is accomplished with difficulty due to limitations associated with preparation of the fine powder. Such limitations, i.e., compactness and the degree of separation can be greatly improved by mixing and pressing metal powders having different particle sizes. This is confirmed from facts that the hydrogen separation membrane, obtained in Example 1 which will be described hereinafter, exhibits, as shown in FIG. 1, significantly improved surface compactness, as compared to the hydrogen separation membranes of Comparative Examples 1 and 2.

A difference in an average particle diameter between the first metal powder and second metal powder is not particularly limited, but it is preferably at least 0.3 µm. More preferably, the first metal powder has an average particle diameter of 0.01 to 0.5 µm and the second metal powder has an average particle diameter of 0.8 to 10 µm.

In addition, in order to improve compactness and the degree of separation, a mixture of the first and second metal powders is preferably composed of 0.5 to 50% by weight of the first metal powder and 50 to 99.5% by weight of the second metal powder.

Metals which can be used as the first and second metal powders may be any metals which have hydrogen adsorption properties and are used as components constituting conventional hydrogen separation membranes. A typical example of such metals includes nickel powder.

Figure 2:
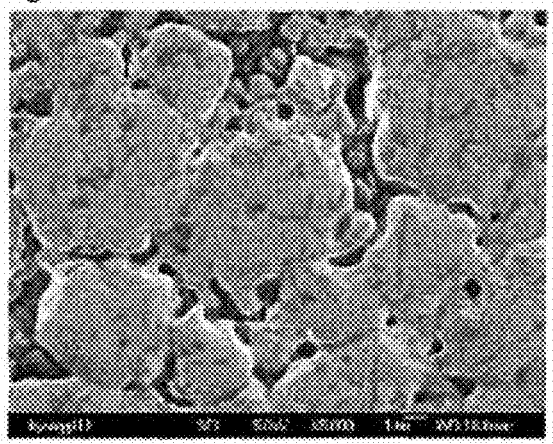
FIG. 2 is an SEM of a porous separation membrane prepared by pressing multi-particle diameter powder consisting of a mixture of 20% by weight of nickel powder having an average particle diameter of 0.15 µm and 80% by weight of nickel powder having an average particle diameter of 5 µm and calcining the resulting material under hydrogen atmosphere at 600° C.
Figure 2:
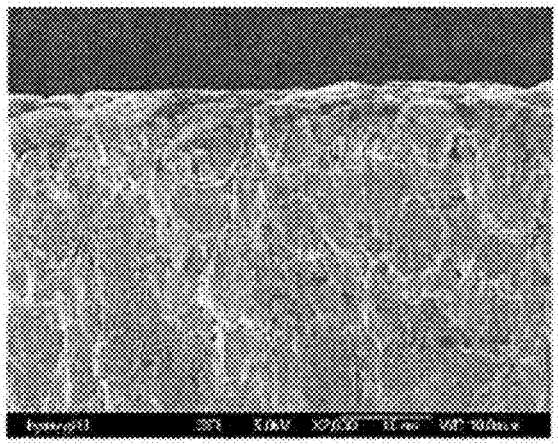
Figure 3:
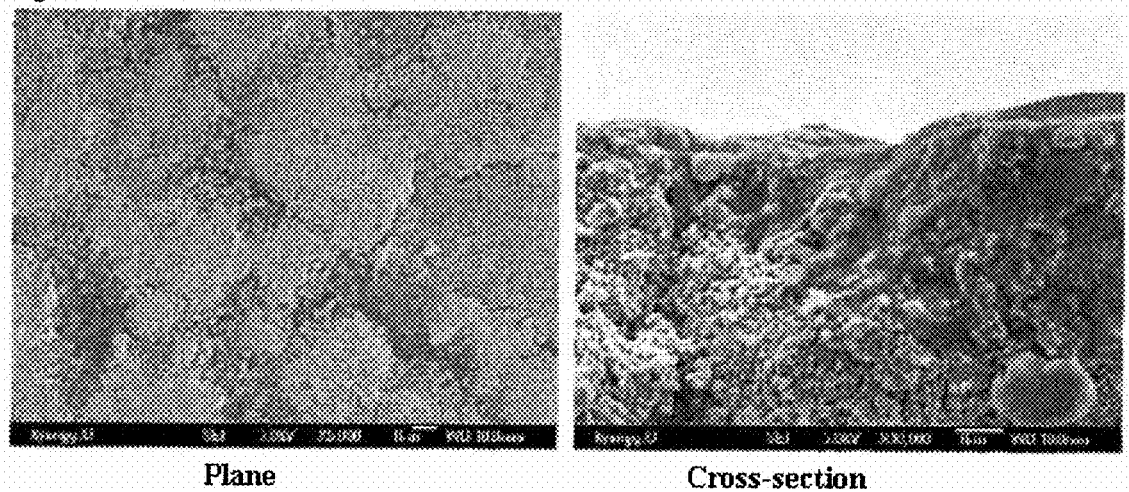
FIG. 3 is an SEM of a porous separation membrane prepared by pressing multi-particle diameter powder consisting of a mixture of 20% by weight of aluminum-coated nickel powder having an average particle diameter of 0.15 µm and 80% by weight of nickel powder having an average particle diameter of 5 µm and calcining the resulting material under hydrogen atmosphere at 600° C.

The first metal powder may employ metal powder itself without any treatment, but special surface treatment of the metal powder may be necessary so as to secure high-temperature stability. Such treatment can be achieved by coating the outer surface of the first metal powder with a particular metal component. Examples of metals that can be coated on the outer surface of the first metal powder include at least one metal having sintering-inhibiting effects and selected from the group consisting of Al, Si, Pt, Pd, Ru, Rh, Au and Ag. As will be described hereinafter, according to the experimental results obtained from the hydrogen separation membrane of Example 2 without sintering-inhibitor coating and the hydrogen separation membrane of Example 3 with sintering-inhibitor coating, a role of the sintering-inhibitor can be confirmed in that hydrogen/nitrogen selectivity of the separation membranes is 12 and 23, respectively. In this connection, referring to FIG. 2 corresponding to Example 2 and FIG. 3 corresponding to Example 3, it can be confirmed that addition of the sintering inhibitor results in stability of the separation membrane structure. In addition, referring to a cross-sectional micrograph of the hydrogen separation membrane as shown in FIG. 3, the first metal powder having a relatively small average particle diameter exhibited intact morphology of microparticles when the sintering inhibitor was applied, while the second metal powder having a relatively large average particle diameter of 5 µm was sintered. Based on such results, it is considered that, in order to ensure high-temperature stability, it is preferred to coat all particles to be used with the sintering inhibitor.

Coating with the sintering inhibitor also serves to further reinforce hydrogen adsorbing power.

A coating process of the sintering inhibitor involves calcining the first metal powder in the air at a temperature of 200 to 400° C. for 1 to 5 hours; supporting a liquid solution containing the sintering inhibitor in the first metal powder by initial wetting; and calcining the supported metal in the air at a temperature of 300 to 400° C. to be immobilized. More simply, it is possible to directly apply a sintering inhibiting material to the outer surface of the first metal powder using a reducing agent (for example, $NaBH_4$). Herein, careful rinsing may be carried out to remove the remnants ($NaBO_2$) of the supplied reducing agent. It is preferable type of process to coat the sintering inhibitor to the metal powder, however it can be replaced by the process of mixing Al and/or Si oxide powder in order to simplify manufacturing process.

The mixed powder of the first and second metal powders is compression-molded to form a molded material having a desired shape. Compression (or press)-molding of the mixed metal powder may be carried out in a mold, preferably under pressure of 1 to 20 tons/cm$^2$. For the purpose of the present invention, the term "compression-molding", "press-molding" and "pressing" are used interchangeably throughout the description of the present invention.

In order to further smoothly perform compression-molding, the second metal powder having a relatively large average particle diameter may be reduced under hydrogen atmosphere at 200 to 500° C.

Although there is no particular limit to calcining conditions, the molded material obtained from the foregoing processes is preferably calcined under hydrogen atmosphere at 500 to 900° C.

EXAMPLES

Now, the present invention will be described in more detail with reference to the following examples. These examples are provided only for illustrating the present invention and should not be construed as limiting the scope and spirit of the present invention.

Example 1

20% by weight of nickel powder having an average particle diameter of 0.15 μm as a first metal powder, and 80% by weight of nickel powder having an average particle diameter of 5 μm as a second metal powder were homogeneously mixed for 30 min using a mortar. 1.3 g of the mixed powder was molded in a circular mold having a diameter of 12.7 mm, thereby preparing a porous separation membrane. Herein, pressure of a press was 9.97 tons/cm$^2$ and the press was maintained in a pressurized state for 1 min.

Figure 6:
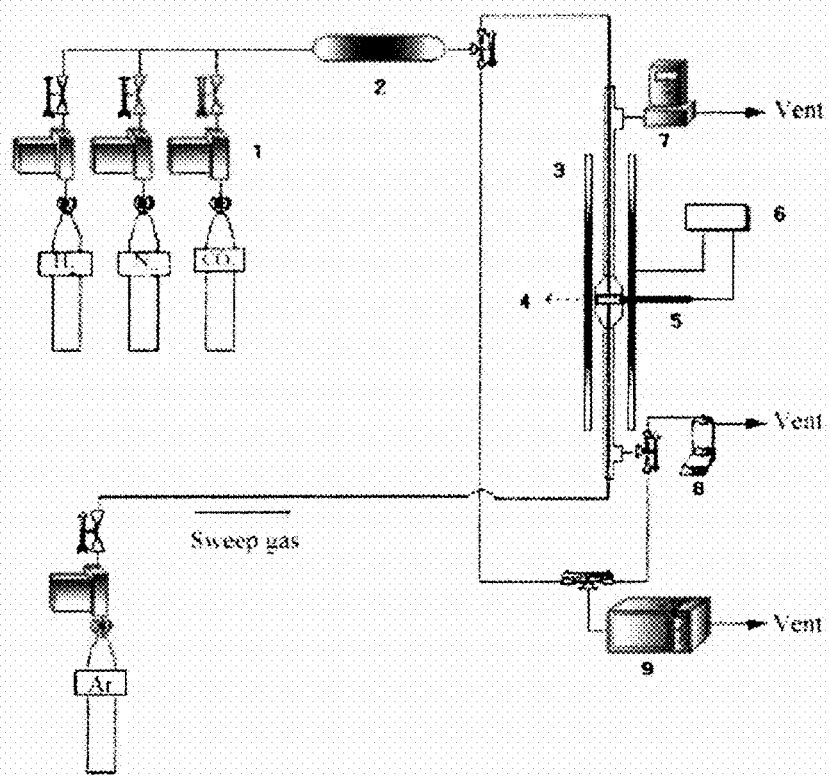
FIG. 6 is a block diagram of a performance evaluation apparatus of porous separation membranes used in working examples of the present invention.

Hydrogen and nitrogen permeability of the thus-prepared porous separation membrane was measured using a gas permeability measuring apparatus constructed as shown in FIG. 6. Hydrogen and nitrogen were respectively supplied, and a flow rate of gases, permeated through the porous separation membrane, was measured while maintaining a pressure difference of 2.2 psi between the front and rear ends of the separation membrane. The experimental apparatus used herein comprised gas flow rate control section 1 capable of supplying each gas (a mass flow control valve and a pressure control valve), and analysis section 9 (gas chromatography) for measuring a flow rate of gas passed through the separation membrane. Reference numerals 2, 3, 4, 5, 6, 7 and 8, details of which are omitted herein, represent, respectively, a gas mixer, an electric heating furnace, a separation membrane, a temperature sensor, a temperature controller, a pressure sensor and controller set, and a soap-bubble flow meter. A unit separation membrane-mounted part was installed within the electric heating furnace capable of controlling temperatures, thereby constantly maintaining a temperature of a permeation membrane at 200° C.

Permeation amounts of hydrogen and nitrogen with respect to the respective pressure parameters were measured by measuring pressure difference at both ends of the separation membrane via installation of the pressure control valve at a discharge line of the supplied non-permeated gas.

Utilizing the respective data of permeation amounts for hydrogen and nitrogen, measured as above, perm-selectivity was determined pursuant to the following equation 1. Herein, the permeation amount of each gas refers to a permeation amount of a single component under conditions in which an area of the separation membrane, a measuring period of time, and a pressure difference were equally reduced. As a carrier gas for discharging the separation membrane-permeated gases, argon (Ar) gas was supplied from the lower end of the separation membrane:

Perm-selectivity (H$_2$/N$_2$)=Permeation amount of hydrogen/Permeation amount of nitrogen    (Equation 1)

As summarized in the following Table 1, it was shown from experimental results that the permeation amount of hydrogen was in the range of 33 to 10 Ml/cm$^2$.atm.min at a pressure of 2.2 to 14.7 psi, the permeation amount of nitrogen was in the range of 1.0 to 1.7 Ml/cm$^2$.atm.min, and therefore hydrogen/nitrogen selectivity was in the range of 32.0 to 6.0.

TABLE 1

Permeation amounts of hydrogen and nitrogen and selectivity (H$_2$/N$_2$) in the separation membrane of Example 1

| Pressure difference (psi) | Hydrogen (Ml/cm$^2$ · min · atm) | Nitrogen (Ml/cm$^2$ · min · atm) | Selectivity (H$_2$/N$_2$) |
|---|---|---|---|
| 2.2 | 33.6 | 1.0 | 32.0 |
| 5.0 | 18.0 | 1.8 | 9.7 |
| 7.3 | 13.8 | 1.9 | 7.3 |
| 14.7 | 10.5 | 1.7 | 6.0 |

Example 2

After calcining the separation membrane, prepared in Example 1, under hydrogen atmosphere at 600□ for 5 hours, hydrogen and nitrogen selectivity thereof was measured. Other conditions for preparation of the separation membrane and for a gas flow rate were the same as in Example 1.

Permeation amounts of the respective gases were measured and the results were summarized in Table 2 below. The results show that the permeation amount of hydrogen was in the range of 181 to 84 Ml/cm$^2$.min.atm, the permeation amount of nitrogen was in the range of 15 to 26 Ml/cm$^2$.min.atm, and therefore hydrogen/nitrogen selectivity was in the range of 11.5 to 3.2.

TABLE 2

Permeation amounts of hydrogen and nitrogen and selectivity (H$_2$/N$_2$) in the separation membrane of Example 2

| Pressure difference (psi) | Hydrogen (Ml/cm$^2$ · min · atm) | Nitrogen (Ml/cm$^2$ · min · atm) | Selectivity (H$_2$/N$_2$) |
|---|---|---|---|
| 2.2 | 181 | 15 | 11.5 |
| 5.0 | 121 | 24 | 4.8 |
| 7.3 | 97 | 22 | 4.2 |
| 14.7 | 84 | 26 | 3.2 |

Upon comparing with the separation membrane of Example 1, it can be seen that an increase in the diameter of pores in the separation membrane has occurred, from the results showing more than 6-fold increase in the permeation amounts of the respective gases, with a 3-fold decrease in gas selectivity.

Example 3

A separation membrane was prepared and annealed in the same manner as in Example 2, except that an outer surface of nickel powder having a particle diameter of 0.15 μm was coated with aluminum. Coating was carried out as follows.

Aluminum nitrate was dissolved in distilled water, nickel powder was added to the resulting solution which was then stirred for 10 min. An aqueous solution of 0.1 mol $NaBH_4$ was slowly added dropwise thereto, thereby increasing the pH of the solution to 8 such that the outer surface of nickel powder was coated with aluminum. The thus-coated powder was washed with distilled water thrice, dried and used.

Permeation amounts of the respective gases were measured and the results were summarized in Table 3 below. The results show that the permeation amount of hydrogen was in the range of 45 to 15 $Ml/cm^2$.min.atm, the permeation amount of nitrogen was in the range of 2 to 3 $Ml/cm^2$.min.atm, and therefore hydrogen/nitrogen selectivity was in the range of 21.5 to 4.6.

TABLE 3

Permeation amounts of hydrogen and nitrogen and selectivity ($H_2/N_2$) in the separation membrane of Example 3

| Pressure difference (psi) | Hydrogen ($Ml/cm^2 \cdot min \cdot atm$) | Nitrogen ($Ml/cm^2 \cdot min \cdot atm$) | Selectivity ($H_2/N_2$) |
|---|---|---|---|
| 2.2 | 45.1 | 2.1 | 21.5 |
| 5.0 | 26.3 | 2.7 | 9.5 |
| 7.3 | 20.1 | 2.8 | 7.1 |
| 14.7 | 15.8 | 3.4 | 4.6 |

Upon comparing with the separation membrane of Example 1, the permeation amounts of the respective gases were increased more than 1.5-times as Example 1 while exhibiting 1.5-fold decrease in gas selectivity. Based on such results, even though it is impossible to secure 100% stability against sintering of the separation membrane, a reduction of the selectivity was very small as compared to Example 2. As such, from these facts, coating of aluminum on the outer surface of nickel powder is evaluated to be a technique capable of imparting thermal stability to the nickel-based porous separation membrane.

Example 4

Utilizing the separation membrane prepared in Example 3, permeation amounts of carbon dioxide, propane and methane were measured, respectively.

Permeation amounts of the respective gases were measured and selectivity to hydrogen was calculated. As summarized in Table 4 below, the results show that a degree of separation of carbon dioxide was highest, i.e., in the range of 43 to 6.7, while a degree of separation of methane having the lowest molecular weight was lowest, i.e., in the range of 8.6 to 3.4. Notably, it was possible to obtain performance significantly surpassing the Knudsen diffusion range for all species of gases measured, even at a high pressure difference of 14.7 psi between both sides of the separation membrane.

TABLE 4

Selectivity to the respective gases in the separation membrane of Example 4

| Pressure difference (psi) | $H_2/N_2$ | $H_2/CO_2$ | $H_2/CH_4$ | $H_2/C_3H_8$ |
|---|---|---|---|---|
| 2.2 | 21.5 | 43.0 | 8.6 | 21.5 |
| 5.0 | 9.5 | 14.2 | 5.7 | 9.5 |
| 7.3 | 7.1 | 9.1 | 4.3 | 7.1 |
| 14.7 | 4.6 | 6.7 | 3.4 | 4.6 |
| Knudsen diffusion | 3.7 | 4.7 | 1.8 | 4.7 |

Comparative Example 1

Figure 4:
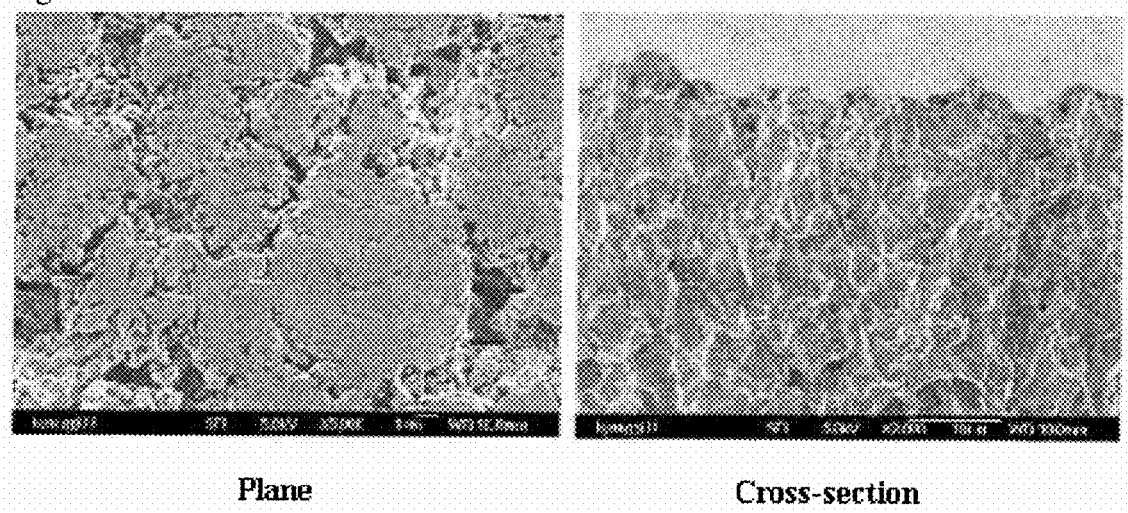
FIG. 4 is an SEM of a porous separation membrane prepared by pressing single-particle diameter nickel powder having an average particle diameter of 5 µm.

A porous separation membrane was prepared and permeation amounts of hydrogen and nitrogen were measured in the same manner as in Example 1, except that the separation membrane was prepared using single-particle diameter nickel powder having a particle diameter of 5 μm (see FIG. 4).

Permeation amounts of the respective gases were measured and the results were summarized in Table 5 below. The results show that the permeation amount of hydrogen was in the range of 58 to 24 $Ml/cm^2$.min.atm, the permeation amount of nitrogen was in the range of 4.2 to 6.7 $Ml/cm^2$.min.atm, and therefore the selectivity ($H_2/N_2$) was low, i.e., in the range of 14.0 to 3.6. In particular, the permeation amount of nitrogen was very large even at low pressure (2.2 psi), as compared to Example 1, and thus it can be confirmed that the separation membrane of Comparative Example 1 exhibits very large average pore distribution. Therefore, it can be seen that the porous separation membrane prepared by pressing single nickel powder having a micrometer size suffers from limitations in preparation thereof

TABLE 5

Permeation amounts of hydrogen and nitrogen and selectivity ($H_2/N_2$) in the separation membrane of Comparative Example 1

| Pressure difference (psi) | Hydrogen ($Ml/cm^2 \cdot min \cdot atm$) | Nitrogen ($Ml/cm^2 \cdot min \cdot atm$) | Selectivity ($H_2/N_2$) |
|---|---|---|---|
| 2.2 | 58.8 | 4.2 | 14.0 |
| 5.0 | 35.5 | 5.5 | 6.4 |
| 7.3 | 29.8 | 5.9 | 5.0 |
| 14.7 | 24.8 | 6.7 | 3.6 |

Comparative Example 2

Figure 5:
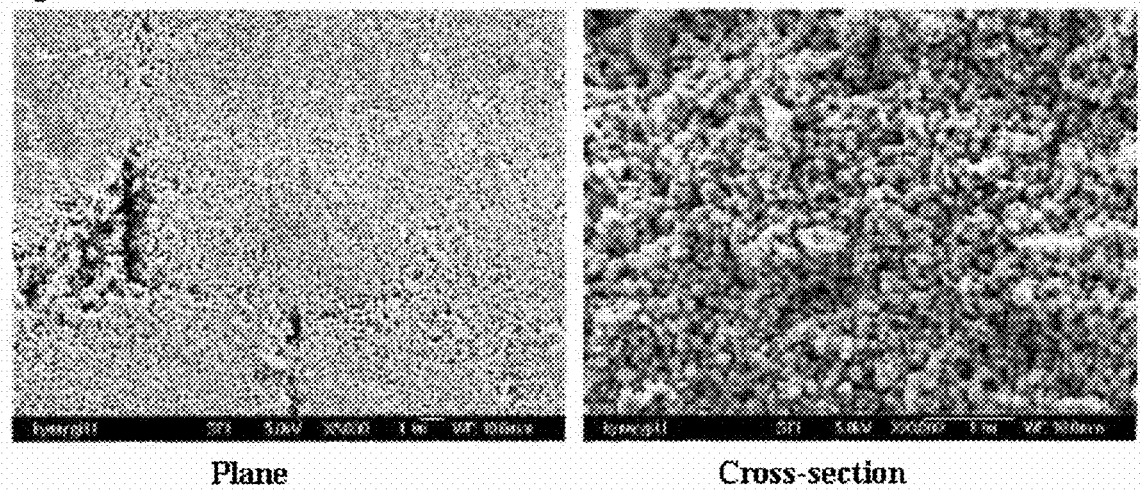
FIG. 5 is an SEM of a porous separation membrane prepared by pressing single-particle diameter nickel powder having an average particle diameter of 0.15 µm.

A porous separation membrane was prepared and permeation amounts of hydrogen and nitrogen were measured in the same manner as in Comparative Example 1, except that the separation membrane was prepared using single nickel powder having a particle diameter of 0.15 μm (see FIG. 5).

Permeation amounts of the respective gases were measured and the results were summarized in Table 6 below. The results show that the permeation amount of hydrogen was in the range of 73 to 17 $Ml/cm^2$.min.atm, the permeation amount of nitrogen was in the range of 3.1 to 3.7 $Ml/cm^2$.min.atm, and therefore the selectivity ($H_2/N_2$) was low, i.e., in the range of 23.3 to 4.7.

Even with use of ultra-fine powder having an average particle diameter 1/33 times as the nickel powder used in Comparative Example 1, the separation membrane of Comparative Example 2 exhibited relatively low selectivity as compared to the separation membrane prepared using the mixed powder of Example 1. Therefore, in the preparation process of the hydrogen separation membrane via pressing molding as in the present invention, use of the powder having multi-particle diameter distribution is considered to be an absolute requirement for obtaining a desired degree of separation.

TABLE 6

Permeation amounts of hydrogen and nitrogen and selectivity ($H_2/N_2$) in the separation membrane of Comparative Example 2

| Pressure difference (psi) | Hydrogen (Ml/cm$^2$ · min · atm) | Nitrogen (Ml/cm$^2$ · min · atm) | Selectivity ($H_2/N_2$) |
|---|---|---|---|
| 2.2 | 73.5 | 3.1 | 23.3 |
| 5.0 | 41.1 | 3.7 | 11.1 |
| 7.3 | 33.0 | 3.7 | 8.7 |
| 14.7 | 17.9 | 3.7 | 4.7 |

As apparent from the above description, the hydrogen separation membrane in accordance with the present invention simultaneously solves a problem of low permeability exhibited by a conventional palladium-based dense separation membrane and a problem of hydrogen embrittlement (HE) exhibited by a stainless steel support. Further, the hydrogen separation membrane in accordance with the present invention can further improve thermal stability thereof by coating the powder with a sintering-inhibiting metal, and is suitable for industrial-scale production due to a simplified and inexpensive manufacturing process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hydrogen separation membrane prepared by press-molding microparticles having hydrogen adsorbing properties, wherein the microparticles are composed of 0.5 to 50% by weight of a first metal powder and 50 to 99.5% by weight of a second metal powder having a relatively larger average particle diameter than the first metal powder, wherein the first metal powder is surface-coated with at Least one metal selected from the group consisting of Al, Si, Pt, Pd, Ru, Rh, Au and Ag.

2. The membrane according to claim 1, wherein the first metal powder is selected from microparticles having an average particle diameter of 0.01 to 0.5 μm.

3. The membrane according to claim 1, wherein the second metal powder is selected from microparticles having an average particle diameter of 0.8 to 10 μm.

4. The membrane according to claim 1, wherein the second metal powder is reduced by pretreatment under hydrogen atmosphere at 200 to 500° C.

5. The membrane according to claim 1, wherein the first metal powder and/or second metal powder are nickel powder.

6. A method for preparing a hydrogen separation membrane containing microparticles having hydrogen adsorption properties, comprising:

mixing 0.5 to 50% by weight of a first metal powder and 50 to 99.5% by weight of a second metal powder having a relatively larger average particle diameter than the first metal powder;

press-molding the mixed powder under predetermined pressure; and calcining the resulting molded material under hydrogen atmosphere.

7. The method according to claim 6, wherein press-molding is carried out under pressure of 1 to 20 tons/cm$^2$.

8. The method according to claim 6, wherein the first metal powder is surface-coated with at least one metal selected from the group consisting of Al, Si, Pt, Pd, Ru, Rh, Au and Ag.

9. The method according to claim 6, wherein the mixing of a first metal powder and a second metal powder includes a mixing step of Al and/or Si oxide powder as a sintering inhibitor.

10. The method according to claim 6, wherein the second metal powder is reduced by pretreatment under hydrogen atmosphere at 200 to 500° C.

11. The method according to claim 6, wherein the first metal powder and/or second metal powder are nickel powder.

12. A hydrogen separation membrane prepared by press-molding microparticles having hydrogen adsorbing properties, wherein the microparticles are composed of 0.5 to 50% by weight of a first metal powder and 50 to 99.5% by weight of a second metal powder having a relatively larger average particle diameter than the first metal powder, wherein the second metal powder is reduced by pretreatment under hydrogen atmosphere at 200 to 500° C.

13. The membrane according to claim 12, wherein the first metal powder is selected from microparticles having an average particle diameter of 0.01 to 0.5 μm.

14. The membrane according to claim 12, wherein the second metal powder is selected from microparticles having an average particle diameter of 0.8 to 10 μm.

15. The membrane according to claim 12, wherein the first metal powder is surface-coated with at least one metal selected from the group consisting of Al, Si, Pt, Pd, Ru, Rh, Au and Ag.

16. The membrane according to claim 12, wherein the first metal powder and/or second metal powder are nickel powder.

* * * * *